US012662009B2

(12) United States Patent
Farkas et al.

(10) Patent No.: US 12,662,009 B2
(45) Date of Patent: Jun. 23, 2026

(54) METHOD AND APPARATUS FOR AUTONOMOUSLY PLUGGING A CHARGING PLUG INTO A CHARGING SOCKET OF A VEHICLE

(71) Applicant: Volkswagen Aktiengesellschaft, Wolfsburg (DE)

(72) Inventors: Zsolt Farkas, Wolfsburg (DE); Daniel Schulze, Braunschweig (DE); Maxim Derksen, Wolfsburg (DE); Lisa Rangosch, Königslutter (DE); Peter Motzko, Schöppenstedt (DE); Robert Schirmer, Braunschweig (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 113 days.

(21) Appl. No.: 18/705,817

(22) PCT Filed: Oct. 21, 2022

(86) PCT No.: PCT/EP2022/079344
§ 371 (c)(1),
(2) Date: Apr. 29, 2024

(87) PCT Pub. No.: WO2023/078695
PCT Pub. Date: May 11, 2023

(65) Prior Publication Data
US 2024/0424932 A1 Dec. 26, 2024

(30) Foreign Application Priority Data
Nov. 5, 2021 (DE) ...................... 10 2021 212 485.2

(51) Int. Cl.
*B60L 53/37* (2019.01)
*B25J 9/16* (2006.01)
(Continued)

(52) U.S. Cl.
CPC ............. *B60L 53/37* (2019.02); *B25J 9/1664* (2013.01); *G06T 7/70* (2017.01); *G06V 10/82* (2022.01);
(Continued)

(58) Field of Classification Search
CPC .......... B60L 53/37; B25J 9/1664; G06T 7/70; G06T 2207/10028; G06T 2207/20084;
(Continued)

(56) References Cited

U.S. PATENT DOCUMENTS

| | | |
|---|---|---|
| 7,999,506 B1 | 8/2011 | Hollar et al. |
| 10,303,180 B1 | 5/2019 | Prats |

(Continued)

FOREIGN PATENT DOCUMENTS

| | | |
|---|---|---|
| CN | 109435730 A | 3/2019 |
| CN | 111619388 A | 9/2020 |

(Continued)

OTHER PUBLICATIONS

PCT/EP2022/079344. International Search Report & Written Opinion (Feb. 20, 2023).

(Continued)

*Primary Examiner* — Sohana Tanju Khayer
(74) *Attorney, Agent, or Firm* — Peter Zura; LOZA & LOZA, LLP

(57) ABSTRACT

Technologies and techniques for autonomously plugging a charging plug into a charging socket of a vehicle, wherein the charging plug is installed on a programmable robot arm of a charging station. A camera is used to locate the charging socket using image analysis of acquired images of the charging socket and the surroundings of the charging station are represented as a digital map including a charging socket region in which the charging socket is located. The charging plug is moved into a plug-in position at a distance from the
(Continued)

10  26  25 charging socket and the digital map is processed into a modified digital map having a remote charging socket region. A plugging-in operation is then performed based on the modified digital map.

20 Claims, 5 Drawing Sheets

(51) Int. Cl.
    *G06T 7/70*          (2017.01)
    *G06V 10/82*      (2022.01)

(52) U.S. Cl.
    CPC ............... *G06T 2207/10028* (2013.01); *G06T 2207/20084* (2013.01)

(58) Field of Classification Search
    CPC ........ G06V 10/82; G06V 10/74; G06V 20/52; G06V 20/647; Y02T 10/70; Y02T 10/7072
    See application file for complete search history.

(56) References Cited

U.S. PATENT DOCUMENTS

| | | | |
|---|---|---|---|
| 11,577,621 B2 | 2/2023 | Brendel et al. | |
| 11,745,606 B2 | 9/2023 | Schob et al. | |
| 12,062,208 B2 * | 8/2024 | Hetrich ..................... | G06T 7/70 |
| 12,175,703 B2 * | 12/2024 | Birchfield ............ | G06N 3/0464 |
| 2012/0233062 A1 | 9/2012 | Cornish | |
| 2015/0002094 A1 | 1/2015 | Haddad et al. | |
| 2015/0042273 A1 * | 2/2015 | Laupin-Villemus ...... | B60L 1/04 320/108 |
| 2018/0056801 A1 * | 3/2018 | Leary ................... | G06V 10/255 |
| 2018/0222050 A1 | 8/2018 | Vu et al. | |
| 2019/0050697 A1 | 2/2019 | Meng et al. | |
| 2019/0278287 A1 * | 9/2019 | Shibata ................... | B60L 53/37 |
| 2019/0340782 A1 | 11/2019 | Sinha et al. | |
| 2020/0311956 A1 * | 10/2020 | Choi ................... | G06V 10/454 |
| 2021/0041887 A1 | 2/2021 | Whitman et al. | |
| 2022/0040860 A1 * | 2/2022 | Cristache ............... | B25J 9/1617 |
| 2022/0105625 A1 * | 4/2022 | Guo ....................... | B25J 9/1661 |
| 2022/0281336 A1 * | 9/2022 | Rodriguez Romero ..................... | B60L 53/37 |
| 2022/0405506 A1 * | 12/2022 | Taamazyan .......... | B25J 15/0608 |
| 2023/0102948 A1 * | 3/2023 | Lee ....................... | B25J 9/1697 700/259 |
| 2024/0176361 A1 * | 5/2024 | Tokuda ............... | G05D 1/2246 |

FOREIGN PATENT DOCUMENTS

| | | |
|---|---|---|
| DE | 102017009237 A1 | 4/2018 |
| DE | 102017205594 A1 | 10/2018 |
| DE | 102018104759 A1 | 9/2019 |
| EP | 3882856 A1 | 9/2021 |

OTHER PUBLICATIONS

Priority German Application No. 102021212485.2. Office Action (May 16, 2022).

Quan et al. "Research on fast identification and location of contour features of electric vehicle charging port in complex scenes." IEEE Access, vol. 10, pp. 26702-26714 (2022).

\* cited by examiner

28

11

15

16

11

16

25

11

METHOD AND APPARATUS FOR AUTONOMOUSLY PLUGGING A CHARGING PLUG INTO A CHARGING SOCKET OF A VEHICLE

RELATED APPLICATIONS

The present application claims priority to International Patent Application No. PCT/EP2022/079344 to Farkas et al., filed Oct. 21, 2022, titled "Method And Apparatus For Autonomously Plugging A Charging Plug Into A Charging Socket Of A Vehicle," which claims priority to German Pat. App. No. DE 10 2021 212 485.2, filed Nov. 5, 2021, to Farkas et al., the contents of each being incorporated by reference in their entirety herein.

TECHNICAL FIELD

The present disclosure relates to technologies and techniques for autonomously plugging a charging plug into a charging socket of a vehicle, wherein the charging plug is installed at a programmable robot arm of a charging station. The present disclosure furthermore relates to an apparatus and to a computer program product for carrying out the method as well as to a computer-readable memory means on which such a computer program product is stored.

BACKGROUND

In addition to autonomously driving electric vehicles, charging systems for autonomously charging electric vehicles have become known in recent years in the prior art. Apart from stationary charging systems, mobile charging robots are also known which at present, however, are generally still in the development phase. The charging robots can be started via an app or via Car-to-X communication, for example, and in the process establish communication with the vehicle and/or a network, such as the Internet. Today, the entire charging process, from opening the charging flap through connecting the plug to decoupling, can be carried out without human involvement.

At present, a challenge that exists is to plug the charging plug into the charging socket as quickly, reliably and damage-free as possible. Initially, it is helpful that the charging sockets and charging plugs are generally standardized. Another aid for achieving as smooth a plug-in process as possible is to position markers at the charging socket, based on which a further reference point is created and enhanced orientation is provided for camera systems at the charging plug. However, position markers are to be largely dispensed with for future charging processes since the visibility of the markers can be impeded, for example due to snow or wear. Moreover, it is not possible for every charging system to process position markers or, depending on which camera and/or software system is used, only certain position markers can be used. A modification of the charging socket is also to be avoided in other respects to the greatest extent possible.

The patent application US 2018/0056801 A1 describes a system for autonomously charging a vehicle in which a charging socket is localized in a camera-based manner. During the localization, additionally various measurement data are evaluated via a cloud system so as to determine as precisely a pose of the charging socket as possible for plugging the charging plug into the charging socket. Another charging system is described in the patent application CN 111619388 A. According to this Chinese patent specification, a cloud-based neural network is used in addition to a camera system for recognizing the charging socket. Nonetheless, improvement potential continues to exist with respect to the detailed design of the charging process.

Moreover, systems are known according to which a digital map of the surrounding area is continuously created for the autonomous contacting between two components and is taken into consideration for the contacting process. The digital map generally serves the collision prevention between the components when planning trajectories. Digital maps of the type in question can be made of cubes or voxels. The smaller the cubes, the more precisely and collision-free can the component contacting be carried out. However, with decreasing size of the cubes, the computing effort also increases. In addition, it may be necessary, regardless of the cube size, to allow a deliberate collision for the contacting between the components since otherwise, for example, the final plug-in process for plugging the charging plug into the charging socket could not be carried out.

SUMMARY

Aspect of the present disclosure are directed to addressing at least some of the above-described problems. In particular, aspects of the present disclosure are directed to providing methods and an apparatuses by way of which a charging plug can be autonomously plugged into a charging socket of a vehicle as quickly, easily and reliably as possible.

Some aspects of the present disclosure are provided in the subject matters of the independent claims, found below. Other aspects are disclosed in the subject matter of the respectively associated dependent claims, the description and the figures. It goes without saying that features that are described in connection with the method also apply in connection with the apparatus according to the present disclosure, the computer program product, and the memory means, and vice versa, so that mutual reference is made, and/or can be made, in each case to the individual aspects of the present disclosure.

In some examples, a method is disclosed for autonomously plugging a charging plug into a charging socket of a vehicle is provided, wherein the charging plug is installed at a programmable robot arm of a charging station. The method, comprising the following steps:

localizing, in a camera-based manner, the charging socket by way of an image analysis of created images of the charging socket;

digitalizing the surrounding area of the charging station in the form of a digital map, including a charging socket region in which the charging socket is situated;

moving the charging plug into a plug-in position, spaced apart from the charging socket;

modifying the digital map into a modified digital map having a removed charging socket region; and plugging the charging plug into the charging socket from the plug-in position, wherein the plugging-in is carried out based on the modified digital map, in particular based on trajectory calculations using the modified digital map.

In some examples, an apparatus is disclosed for autonomously moving and plugging a charging plug into a charging socket of a vehicle according to a method as that described above in detail is provided. The apparatus comprises:

a charging station comprising a programmable robot arm at which the charging plug is installed;

a camera unit, mounted at the robot arm, for the camera-based localization of the charging socket, for creating the images to be analyzed and for creating the depth image of the charging socket; and a processing unit for digitalizing the surrounding area of the charging station in the form of a digital map, including a charging socket region in which the charging socket is situated, and for modifying the digital map into a modified digital map having a removed charging socket region.

The entails the same advantages as those that were described in detail with respect to the method. The camera system preferably comprises a camera, which is installed at the robot arm in a predefined position and orientation with respect to the charging plug. This means that a relative movement between the camera and the charging plug is to be prevented to ensure as precise a plug-in process as possible. So as to obtain the pieces of depth information or the depth image, the camera is preferably designed as a stereo RGB camera, but may also be configured as a 3D camera. The processing unit and the comparison unit can be or have been provided locally, for example in a control device of the vehicle, and/or in a decentralized manner, in particular in a cloud-based manner in the Internet. The processing unit can furthermore be configured to determine the pose data for determining the pose of the localized charging socket, using a Perspective-n-Point (PnP) algorithm. The apparatus can furthermore comprise a comparison unit for carrying out the comparison between the determined depth image and the reference depth image corresponding to a reference position so as to determine the position deviation between the current position of the charging plug and the reference position.

The charging station may be configured as a mobile charging station. In this way, the charging process, and in particular the plug-in process according to the invention of the charging plug into the charging socket, can be carried out particularly flexibly. In general, the vehicle does not have to park in a predefined position at the charging station and/or in relation to the charging station. The orientation of the vehicle with respect to the charging station can also generally be arbitrarily selected. A mobile charging station can in particular be understood to mean a self-driving and/or autonomously driving or moving charging station.

In some examples, a computer program product is disclosed, which encompasses commands that cause the above-described apparatus to carry out the described method steps. Furthermore, a computer-readable memory means is provided, on which such a computer program product is stored. The computer program product according to the invention and the memory means thus likewise offer the above-described advantages. The memory means is preferably provided in the form of a non-volatile memory means.

The computer program product can be implemented in the form of computer-readable instruction code in any suitable programming language and/or computer language, such as JAVA, C++, C# and/or Python. The computer program product can be stored on a computer-readable memory medium such as a data disk, a removable drive, a volatile or non-volatile memory, or an integrated memory/processor. The instruction code can program a computer or other programmable devices, such as a control unit, in such a way that the desired functions are carried out. Furthermore, the computer program product can be provided in a network, such as the Internet, from where it can be downloaded by a user as needed. The computer program product can be implemented both by means of software and by means of one or more special electronic circuits, that is, as hardware, or in any hybrid form, that is, by means of software components and hardware components.

Further measures that enhance the invention will be apparent from the following description of different exemplary embodiments of the invention, which are schematically illustrated in the figures. All of the features and/or advantages that can be derived from the claims, the description or the figures, including design details and spatial arrangements, are contemplated to be used both alone and in the various combinations.

DETAILED DESCRIPTION

Figure 1:
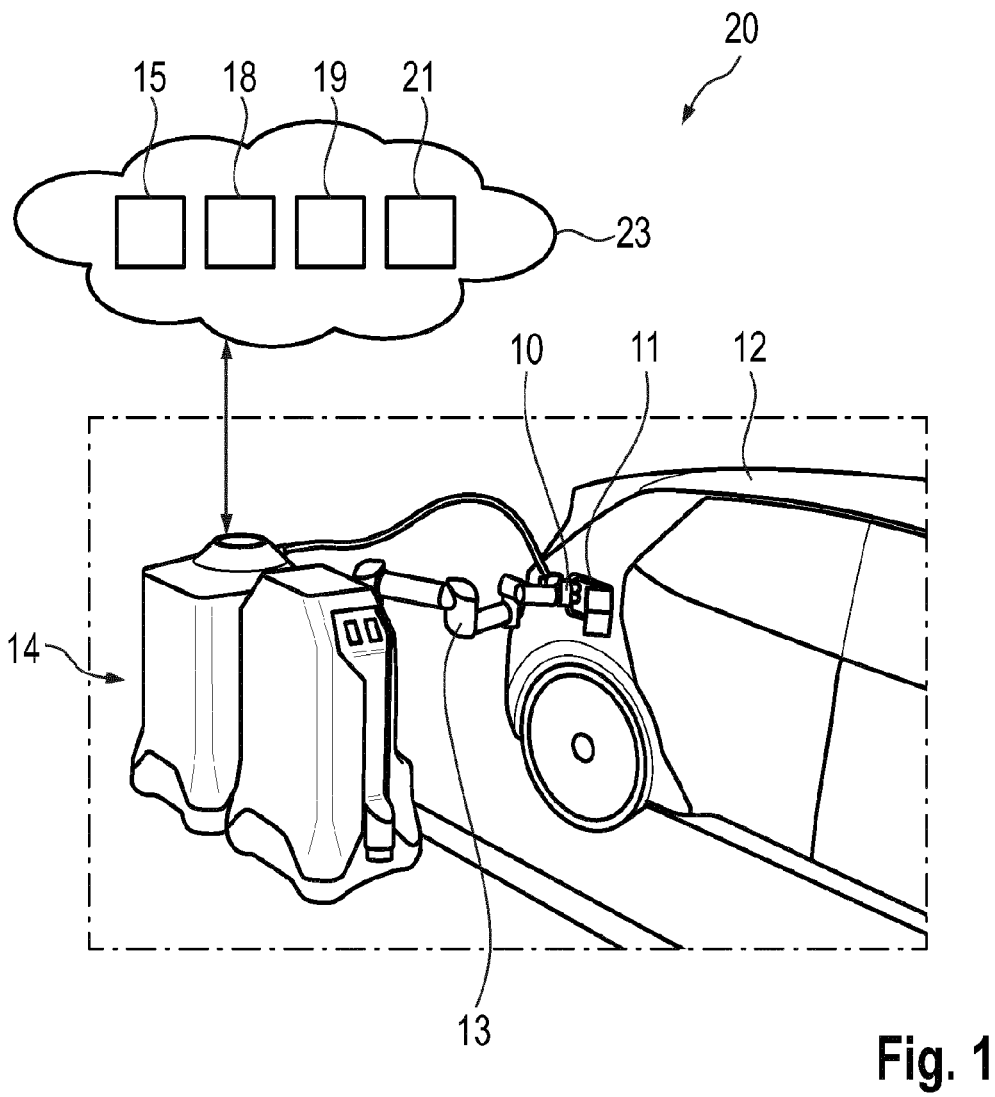
FIG. 1 shows an apparatus for autonomously plugging a charging plug into a charging socket of a vehicle according to some aspects of the present disclosure.

Elements having identical functions and/or mechanisms of action are in each case denoted by identical reference numerals in the figures.

Using a modified digital map according to the present disclosure, it is possible for the plugging-in of the charging plug into the charging socket to be carried out particularly quickly and with relatively little computing effort. During experiments conducted within the technologies and techniques of the present disclosure, it was found that undesirable mechanical contacting of the charging plug, in a region next to the charging socket, and/or damage to the vehicle and/or the charging socket can be substantially minimized by the precise "gap" in the digital map, at least when the charging plug is in a sufficiently precise plug-in position for plugging-in. The digital map being modified into a modified digital map without the charging socket region may be understood to mean that a modified digital map is used, from which the charging socket region is or was removed and/or hidden. This means that no voxels are present in the charging socket region and/or no digitalization of the surrounding area is present in the modified digital map. In other words, a gap, a data hole and/or an accordingly empty region can be designed in the charging socket region. The digital map is preferably provided in the form of an octomap. This means that the surrounding area of the charging station can be created and/or provided in the form of an octomap. The octomap or the digital map is continuously created and, in the process, can likewise be continuously changed and/or adapted. The charging socket region shall be understood to mean a region of the digital map in which at least the charging socket, and possibly also an edge region in the vicinity of the charging socket, is situated or would be situated. The modification of the digital map for the plug-in process can be carried out by a processing unit. Accordingly, the plugging-in can be carried out based on trajectory calculations using the modified digital map.

Localizing the charging socket in a camera-based manner may be understood to mean recognizing the charging socket using a camera system by way of which the images are created or recorded. This means that, initially, only the presence of the charging socket is identified using a camera. A "vehicle" as used herein should be understood to mean a road vehicle, such as a passenger car or a truck, in particular an electric vehicle comprising a drive battery. The vehicle may also be understood to mean a corresponding watercraft, a rail vehicle or a robot comprising a drive battery.

In some examples, image analysis may be carried out using a neural network, pre-trained on the charging socket. By using a neural network that is pre-trained on the charging socket, it is possible for the charging socket to be recognized quickly and reliably without position and/or orientation markers. An optical modification of the charging socket and/or of a charging socket region can be dispensed with. It is preferred when predefined position features at the charging socket are recognized by means of the neural network so as to recognize the charging socket. This means that predefined position features at the charging socket or on the images of the charging socket are recognized by means of the pre-trained neural network, by way of which it is also possible thereafter to determine, in particular calculate, a pose of the charging socket, for example by means of a PnP algorithm. The neural network may be configured in the form of a so-called residual neural network for keypoint detection. The recognized keypoints or position features can additionally be used to subsequently determine the pose by means of the PnP algorithm. This means that the charging socket can be recognized quickly, easily and reliably based on distinct points at the charging socket with the aid of the pre-trained neural network. For this purpose, the neural network can in particular be or have been pre-trained on a certain charging socket and/or a standardized charging socket, and in particular predefinable position features of the charging socket. However, it is also possible for the neural network to be or have been pre-trained on various similar charging sockets. Within the scope of the camera-based localization of the charging socket, the charging socket can be recognized by the camera with a predefined or predefinable frequency, whereby corresponding images are generated. These images are continuously analyzed with respect to the predefined position features by means of the pre-trained neural network. The images analyzed or evaluated in this way can also be evaluated in each case by means of the PnP algorithm so as to determine the pose of the charging socket.

In some examples, following steps may also be carried out:

based on the analyzed images, determining pose data for determining a pose of the localized charging socket using a PnP algorithm;

based on the determined pose data, moving the charging plug into an intermediate position;

when the charging plug is in the intermediate position, creating a depth image of the charging socket corresponding to the current position of the charging plug;

carrying out a comparison between the determined depth image and a reference depth image corresponding to a reference position so as to determine a position deviation between the current position of the charging plug and the reference position; and based on the determined position deviation, moving the charging plug into the plug-in position.

As a result of the combination of the camera-based localization of the charging socket, the PnP algorithm for roughly estimating the pose of the charging socket and the use of the depth image information for specifying the pose or a corresponding calculation result in greater detail, the pose of the charging socket can be determined in a relatively quick, simple and reliable manner. In some examples, the rough estimation of the pose can initially be carried out with relatively little computing power, and thus accordingly quickly and efficiently, due to the camera-based localization of the charging socket as well as the additional use of the PnP algorithm. The intermediate position can consequently also be calculated relatively quickly and be moved into by the charging plug. Only after the charging plus is situated sufficiently close to the charging socket is the pose to be determined or the plug-in position specified in greater detail by means of the comparison between the determined depth image and the reference depth image. In this way, the overall required computing power can be kept relatively low.

At this point, data and/or portions of information regarding the pose of the charging socket are not yet determined in the process, or are only roughly determined. Nonetheless, the images can already be analyzed and/or evaluated by an image analysis means and thereby be prepared for use for the subsequent determination of the pose data. This means that the images and/or corresponding image data can be prepared by the image analysis for the subsequent determination of the pose data or of the associated pose. In the present example, the pose of the charging plug may be understood to mean a position and an alignment or orientation of the charging plug in the three-dimensional space. A pose can accordingly encompass a position in the x-direction, in the y-direction and in the z-direction, as well as an orientation with respect to a roll angle, a pitch angle as well as a yaw angle.

The PnP algorithm shall be understood to mean a Projective-n-Point algorithm, that is, a mathematical model for determining and/or estimating the pose of the charging socket based on predefined, determined and/or read-out pixels on the images. The pixels used for the PnP algorithm can be determined within the scope of the image analysis. The images of the charging socket shall be understood to mean images of the charging socket and of the surrounding area of the charging socket that were recorded by a camera system. The pose data encompass the data, in particular the spatial coordinates and angular information, by which the pose is or has been defined. The images can furthermore be understood as images of a digital map, in particular of an octomap, according to which the surrounding area of the charging station is digitalized by way of a plurality or small cubes. Images of the camera system for localizing the charging socket can additionally be converted into images of a digital map for positioning the charging socket or for moving the charging socket into an intermediate position and/or into the plug-in position, and can be used accordingly within the scope of the present disclosure.

The determination of the pose data or of the pose can be carried out continuously, in particular while the charging plug is being moved into the intermediate position or into at least one intermediate position. Within the scope of the present disclosure, the pose and the associated pose data are preferably calculated on a regular basis at a predefined and/or pre-definable frequency. Based on the respective calculated pose data, the charging plug can be moved into different and/or several intermediate position so as to incrementally approach the charging socket. In other words, the transition from the charging plug initially roughly approaching the charging socket by means of the PnP algorithm to more finely approaching it by means of pieces of depth image information does not have to take place after the first or a single intermediate position of the charging plug has been assumed.

The depth image can be created by a suitable camera system, such as a stereoscopic camera system or a 3D camera system, which may be mounted at the robot arm. The depth image shall be understood to mean an image including pieces of depth information. The reference depth image can be read out from a local memory or from a network memory via a network, for example the Internet. This means that the reference depth image is or was recorded prior to the depth image. The reference depth image is or was recorded from a fixedly defined distance and/or from a fixedly defined position with respect to the charging plug. The position from which the reference depth image is recorded or created is selected so that the charging plug can be plugged into the charging socket by way of a fixedly programmed or programmable movement of the robot arm. So as to create the reference depth image, the charging plug can, for example, be plugged into the charging socket and thereafter be linearly unplugged by a predefined or pre-definable value, for example in a range between 10 cm and 40 cm, and be moved away from or moved out of the charging socket. Based on the determined pose data, the charging plug can be moved into an intermediate position, or into at least one intermediate position, toward the charging socket. Based on the determined position deviation, the charging plug is preferably moved from this or from an intermediate position into the plug-in position. The plug-in position is preferably situated closer to the charging socket than the intermediate position from which the charging plug is moved into the plug-in position.

The charging plug being moved into the intermediate position based on the determined pose data shall be understood to mean that the charging plug is moved into the intermediate position, taking the pose data into consideration and/or using the pose data for a movement calculation. The charging plug being moved into the plug-in position, spaced apart from the charging socket, based on the determined position deviation shall be understood to mean that the charging plug is moved into the intermediate position, spaced apart from the charging socket, taking the position deviation into consideration and/or using deviation data corresponding to the position deviation.

In some examples, it is furthermore possible for the pose to be determined by additionally determining the mean value of the pose data. Experiments conducted within the scope of the present disclosure have shown that additionally determining the mean value of the pose data can achieve an improved or more precise estimation. The additional mean value determination can be carried out continuously while the PnP algorithm is being employed or used. This means that, using the PnP algorithm, it is possible to calculate pose data multiple times and/or continuously, which are accordingly expanded by the additional mean value determination, so that the particular pose can be determined or calculated based on an even larger data base. By determining the mean value of multiple estimations and/or pose values, using the PnP algorithm, it is possible to continuously specify the subsequent pose more precisely from different poses. In the process, the charging plug can be continuously and/or incrementally approach the charging socket.

In some examples, it is also possible to use a reference depth image recorded from a predefined distance and/or position with respect to the charging socket as the reference depth image. The predefined distance is preferably in a range between 10 cm and 40 cm, and in particular in a range between 20 cm and 30 cm. Experiments conducted within the scope of the present disclosure have shown that the plug-in process from this distance by means of a linear movement of the charging plug can be carried out reliably. A plug-in position closer to the charging socket would increase the risk of an undesirable collision with the vehicle and/or the charging socket. A plug-in position further away from the vehicle would delay the plug-in process and make it more susceptible to errors as well as increase the computing effort.

In addition, it is possible for the position deviation to be determined using an Iterative Closest Point (ICP) algorithm. Using the ICP algorithm, it is possible to carry out the position deviation, and the resultant displacement or movement of the charging plug from the intermediate position into the plug-in position, particularly precisely. Utilizing the ICP algorithm, it is possible to ensure fine positioning with a consistent positioning result. The ICP algorithm builds in particular on the previously conducted mean value determination. Experiments conducted within the scope of the present disclosure have shown that the combination of the described mean value determination with the ICP algorithm efficiently enables particularly precise positioning of the charging plug.

Turning to FIG. 1, the exemplary drawing shows an apparatus 20 for autonomously moving and plugging a charging plug 10 into a charging socket 11 of a vehicle 12. The apparatus 20 comprises a mobile charging station 14 comprising a programmable robot arm 13 at which the charging plug 10 is installed. More precisely, the charging station 14 is provided in the form of an autonomously movable charging station 14, which can communicate wirelessly via Car-to-X with the vehicle 12 and is connected to the Internet. Furthermore, a camera system 17 indicated in FIGS. 8 and 9 or a corresponding camera is mounted at the robot arm 13 for the camera-based localization of the charging socket 11 and for the creation of depth images or images including pieces of depth information of the charging socket 11 as well as of a surrounding area of the charging socket 11.

Figure 2:
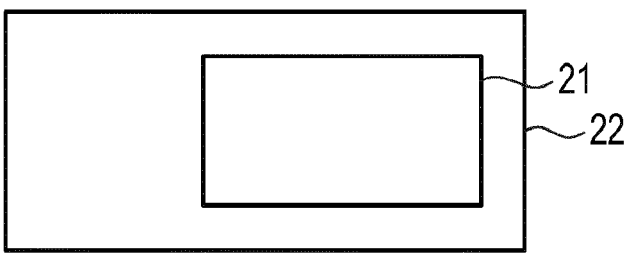
FIG. 2 shows a memory means including a computer program product stored thereon according to an embodiment according to some aspects of the present disclosure.

In a cloud 23, which can be accessed via the Internet, a processing unit 18 for determining the pose data so as to determine the pose of the localized charging socket 11, using the PnP algorithm, and a comparison unit 19 for carrying out the comparison between the determined depth image and the reference depth image corresponding to a reference position so as to ascertain the position deviation between the current position of the charging plug 10 and the reference position are provided. The processing unit 18 is furthermore configured to digitalize the surrounding area of the charging station 14 in the form of a digital map 26, including a charging socket region 25 in which the charging socket 11 is situated, and to modify the digital map 26 into a modified digital map 27 having a removed charging socket region 25. Furthermore, a neural network 15 and a computer program product 21 can be accessed via the cloud 23 or in the cloud 23. The computer program product 21 encompasses commands that cause the apparatus shown in FIG. 1 to carry out method steps that are described hereafter with further reference to FIGS. 3 to 10. As is shown in FIG. 2, the computer program product 21 can also be stored on a portable memory means 22. The memory means 22 is configured as a computer-readable, non-volatile memory means 22.

Figure 3:
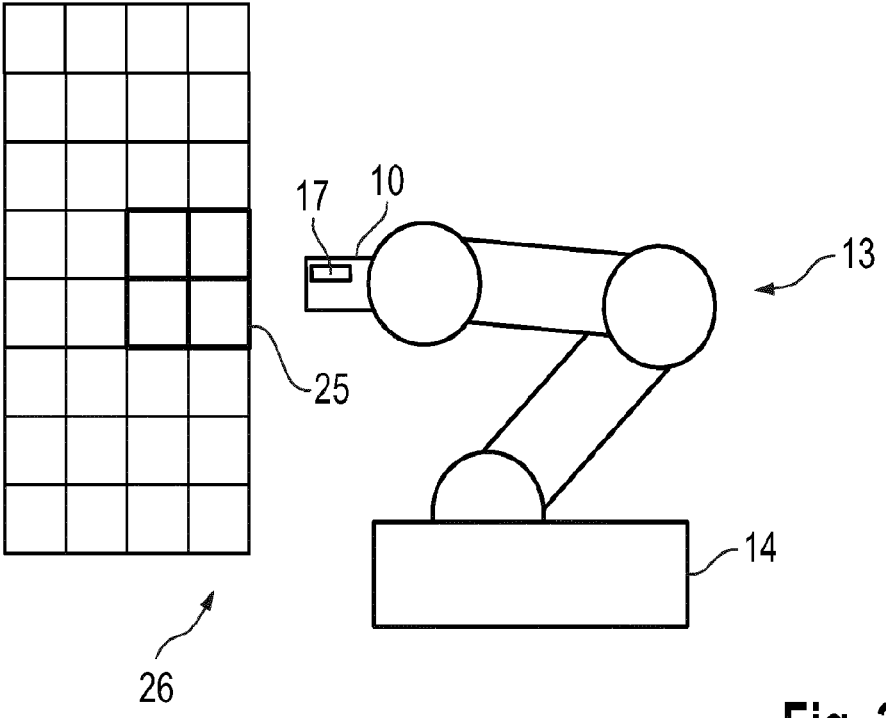
FIGS. 3 and 4 show illustrations to describe a method for autonomously plugging a charging plug into a charging socket according to some aspects of the present disclosure.
Figure 4:
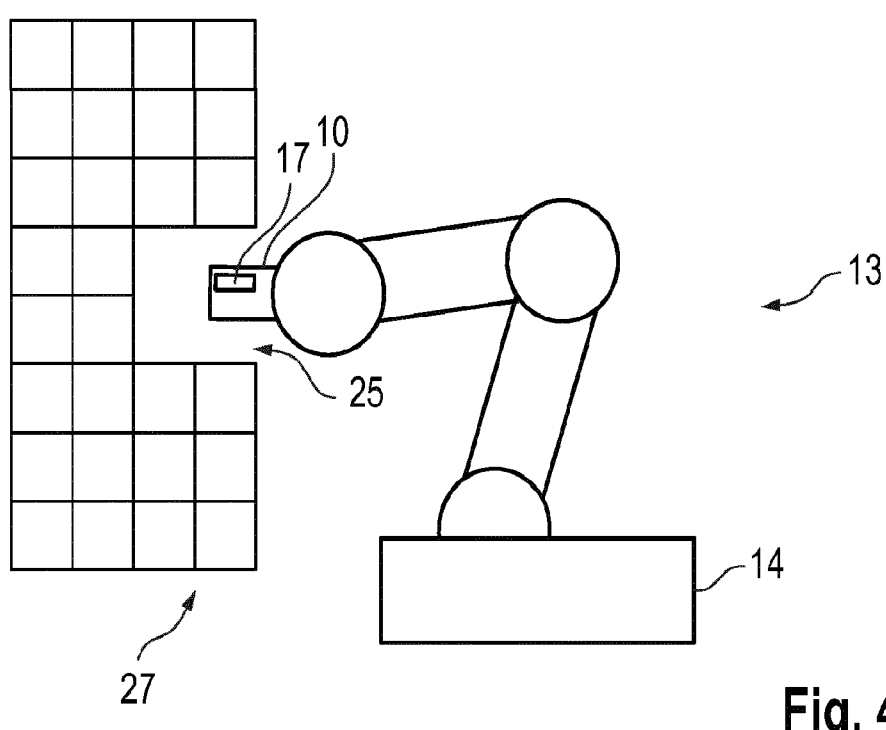

With reference to FIGS. 3 and 4, a method for autonomously plugging the charging plug 10 into a charging socket 11 is described hereafter with reference to the core aspects of the present disclosure according to a first embodiment.

Figure 5:
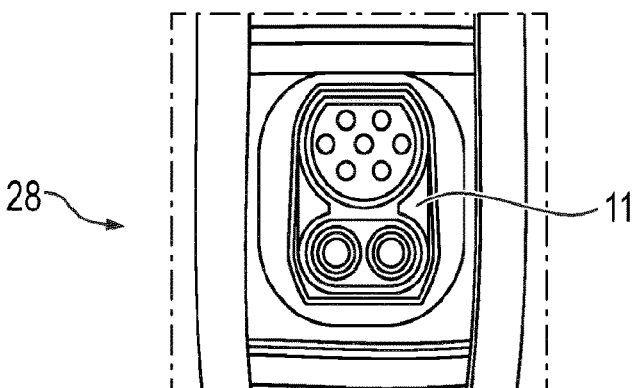
FIGS. 5 to 10 show illustrations to describe a method for autonomously plugging a charging plug into a charging socket according to some aspects of the present disclosure.

For this purpose, the charging socket 11 is initially accordingly localized in a camera-based manner by way of an image analysis of, as shown in FIG. 5, created images 28 of the charging socket 11, which are and/or were recorded by the camera system 17. Moreover, the surrounding area of the charging station 14 is digitalized based on the created images 28 and/or based on additional images 28, containing pieces of depth information, in the form of a digital map 26, including a charging socket region 25 in which the charging socket 11 is situated. This means that the surrounding area of the charging station 14 is digitalized by means of the camera system 17 in the form of a three-dimensional digital map 26, or more precisely, in the form of an octomap. Thereupon or during this process, the charging plug 10 is moved into a plug-in position spaced apart from the charging socket 11. The digitalized surrounding area of the charging area 14 including the robot arm 13 at which the charging plug 10 is situated in the plug-in position is shown in FIG. 3.

Thereafter, the digital map 26, as shown in FIG. 4, is modified into a modified digital map 27 having a removed charging socket region 25. Thereupon, the charging plug 10 is plugged into the charging socket 11 from the plug-in position based on the modified digital map 27.

Figure 6:
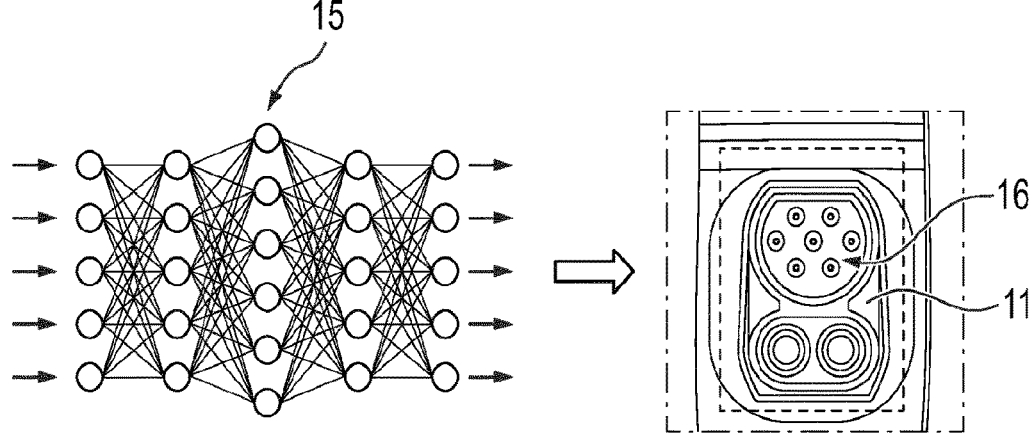
Figure 7:
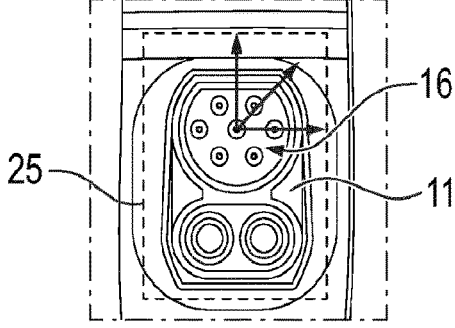

With reference to FIGS. 1, and 5 to 10, a method for autonomously plugging the charging plug 10 into a charging socket 11 according to a further embodiment is described hereafter. Here as well, the charging socket 11, as shown in FIG. 5, is initially localized in a camera-based manner, initially by way of an image analysis of created images 28 of the charging socket 11, which are and/or were recorded by the camera system 17. As is shown in FIG. 6, the image analysis is carried out using a neural network 15 pre-trained on position features 16 of the charging socket 11. Position features or keypoints at the charging socket 11 that were pre-trained within the scope of the image analysis are recognized by means of the neural network 15. Based on the images 28 thus analyzed, pose data for determining a pose of the localized charging socket 11 are determined, using a PnP algorithm, as is shown in FIG. 7. Based on the determined pose data, the charging plug 10 is moved into an intermediate position. The method steps described with reference to FIGS. 6 and 7 are carried out multiple times, while the charging plug 10 is being guided increasingly closer to the charging socket 11 via several intermediate positions. The pose is, or the respective poses are, determined by additionally determining the mean value of the pose data.

Figure 8:
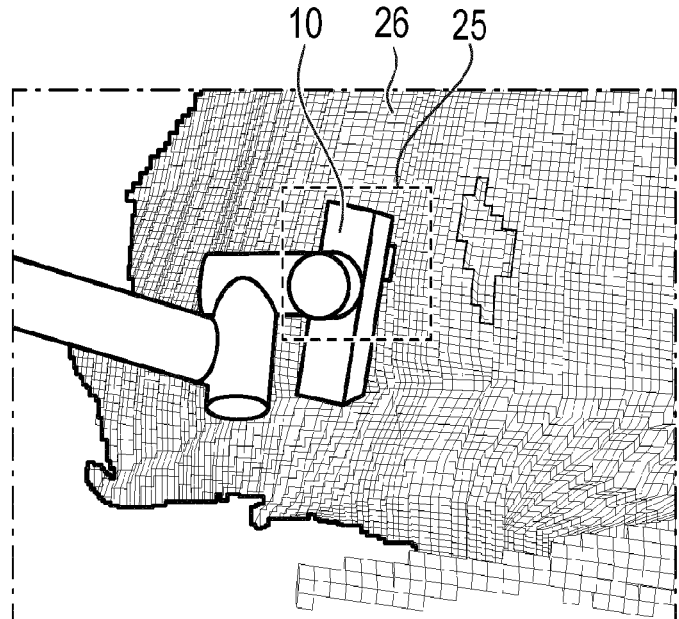

As soon as the charging plug 10, as shown in FIG. 8, reaches a predefined or pre-definable intermediate position which is situated sufficiently close to or spaced a predefined or pre-definable distance apart from the charging socket 10, a depth image of the charging socket 11 which corresponds to the current position of the charging plug 10 is created using the camera system 17. Thereafter, a comparison or a corresponding processing operation is carried out between the determined depth image and a reference depth image corresponding to a reference position so as to determine a position deviation between the current position of the charging plug 10 and the reference position. The reference depth image was recorded in advance from a predefined distance and orientation with respect to the charging socket 11 and is read out from a memory for the calculations. In the shown example, the reference position is situated 25 cm away from the charging socket 11 or in a position in which the charging plug 10 is spaced a distance of 25 cm apart from the charging socket 11. The position deviation is determined using an ICP algorithm. Based on the determined position deviation, the charging plug 10 is then moved into a plug-in position, which is spaced apart from the charging socket 11.

Figure 9:
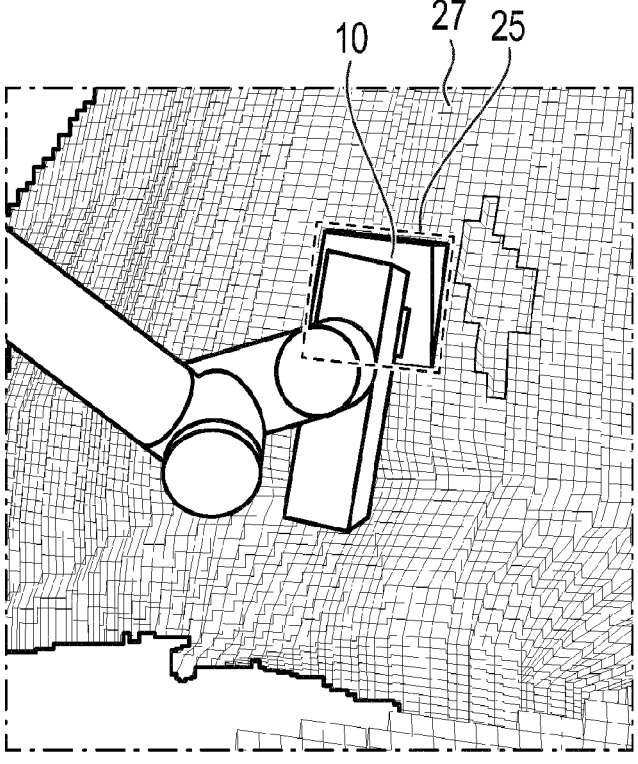
Figure 10:
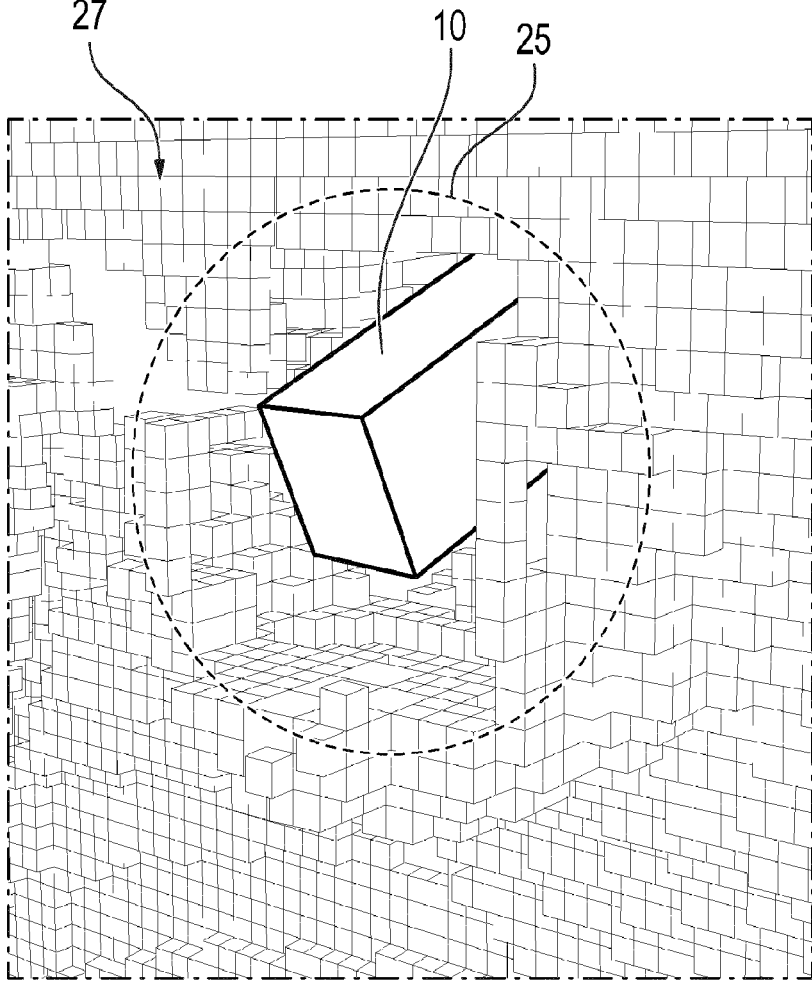

When the charging plug 10 is located in the plug-in position, the digital map 26 is modified into a modified digital map 27 without the charging socket region 25. This means that the voxels or cubes of the charging socket region 25 are removed from the original digital map 26. An accordingly modified digital map 27 including a charging plug 10 in the plug-in position is shown in FIG. 9, and in further detail in FIG. 10. Based on the modified digital map 27, the charging plug 10 is now plugged into the charging socket 11. During the plug-in process, the modified digital map 27 can be further modified. It is also possible that the modification of the original digital map 26 is not carried out until a plug-in movement.

In addition to the shown embodiments, the invention allows further design principles. As a result, the invention shall not be considered to be limited to the exemplary embodiments described with reference to the figures.

LIST OF REFERENCE NUMERALS

10 charging plug
11 charging socket
12 vehicle
13 robot arm
14 charging station
15 neural network
16 position features
17 camera system
18 processing unit
19 comparison unit
20 apparatus
21 computer program product
22 memory means
23 cloud
25 charging socket region
26 digital map
27 modified digital map
28 image

The invention claimed is:

1. A method for autonomously plugging a charging plug of a programmable robot arm into a charging socket of a vehicle, comprising:
visually identifying the charging socket using image analysis of created images of the charging socket;
processing image data of a surrounding area of the charging station to generate a digital map comprising a charging socket region in which the charging socket is configured;
moving, via the programmable robot arm, the charging plug into a plug-in position, spaced apart from the charging socket;
processing the digital map to generate a modified digital map comprising a removed charging socket region; and
plugging, via the programmable robot arm, the charging plug into the charging socket from the plug-in position, wherein the plug-in process is carried out based on the modified digital map.

2. The method according to claim 1, wherein the image analysis is carried out via a neural network pre-trained on the charging socket.

3. The method according to claim 1, further comprising:
determining pose data, based on the image analysis, to determine a pose of the charging socket using a Perspective-n-Point (PnP) algorithm; and moving the charging plug into an intermediate position based on the determined pose data.

4. The method according to claim 3, wherein the pose is determined by additionally determining the mean value of the pose data.

5. The method according to claim 3, further comprising:

generating a depth image of the charging socket corresponding to the current position of the charging plug when the charging plug is in the intermediate position;

processing the generated depth image with a reference depth image corresponding to a reference position to determine a position deviation between the current position of the charging plug and the reference position; and moving the charging plug into the plug-in position based on the determined position deviation.

6. The method according to claim 5, wherein the reference depth image comprises a reference depth image recorded from a predefined distance and/or position with respect to the charging socket.

7. The method according to claim 5, wherein the position deviation is determined using an Iterative Closest Point (ICP) algorithm.

8. An apparatus for autonomously operating a charging station, comprising:

a programmable robot arm comprising a charging plug, wherein the programmable arm is configured for autonomous operation;

a camera unit, operatively coupled to the programmable robot arm; and a processing apparatus, operatively coupled to the camera unit, wherein the processing apparatus is configured to visually identify a charging socket using image analysis of created images via the camera unit;

process image data of a surrounding area of the charging station to generate a digital map comprising a charging socket region in which the charging socket is configured;

move, via the programmable robot arm, the charging plug into a plug-in position, spaced apart from the charging socket;

process the digital map to generate a modified digital map comprising a removed charging socket region; and plug, via the programmable robot arm, the charging plug into the charging socket from the plug-in position, wherein the plug-in process is carried out based on the modified digital map.

9. The apparatus according to claim 8, wherein the processing apparatus is configured to carry out the image analysis via a neural network pre-trained on the charging socket.

10. The apparatus according to claim 8, wherein the processing apparatus is further configured to:

determine pose data, based on the image analysis, to determine a pose of the charging socket using a Perspective-n-Point (PnP) algorithm; and move the charging plug into an intermediate position, based on the determined pose data.

11. The apparatus according to claim 10, wherein the processing apparatus is further configured to determine the pose by additionally determining the mean value of the pose data.

12. The apparatus according to claim 10, wherein the processing apparatus is further configured to:

generate a depth image of the charging socket corresponding to the current position of the charging plug when the charging plug is in the intermediate position;

process the generated depth image with a reference depth image corresponding to a reference position to determine a position deviation between the current position of the charging plug and the reference position; and move the charging plug into the plug-in position based on the determined position deviation.

13. The apparatus according to claim 12, wherein the reference depth image comprises a reference depth image recorded from a predefined distance and/or position with respect to the charging socket.

14. The apparatus according to claim 12, wherein the processing apparatus is further configured to determine the position deviation using an Iterative Closest Point (ICP) algorithm.

15. A method for autonomously plugging a charging plug of a programmable robot arm into a charging socket of a vehicle, comprising:

visually identifying the charging socket using image analysis of created images of the charging socket, wherein the image analysis is carried out via a neural network pre-trained on the charging socket;

processing image data of a surrounding area of the charging station to generate a digital map comprising a charging socket region in which the charging socket is configured;

moving, via the programmable robot arm, the charging plug into a plug-in position, spaced apart from the charging socket;

processing the digital map to generate a modified digital map comprising a removed charging socket region; and plugging, via the programmable robot arm, the charging plug into the charging socket from the plug-in position, wherein the plug-in process is carried out based on the modified digital map.

16. The method according to claim 15, further comprising:

determining pose data, based on the image analysis, to determine a pose of the charging socket using a Perspective-n-Point (PnP) algorithm; and moving the charging plug into an intermediate position based on the determined pose data.

17. The method according to claim 16, wherein the pose is determined by additionally determining the mean value of the pose data.

18. The method according to claim 16, further comprising:

generating a depth image of the charging socket corresponding to the current position of the charging plug when the charging plug is in the intermediate position;

processing the generated depth image with a reference depth image corresponding to a reference position to determine a position deviation between the current position of the charging plug and the reference position; and moving the charging plug into the plug-in position based on the determined position deviation.

19. The method according to claim 18, wherein the reference depth image comprises a reference depth image recorded from a predefined distance and/or position with respect to the charging socket.

20. The method according to claim 18, wherein the position deviation is determined using an Iterative Closest Point (ICP) algorithm.

* * * * *